United States Patent [19]

Schneider

[11] 4,161,325

[45] Jul. 17, 1979

[54] SUPPLEMENTARY SUPPORT FOR VEHICLES

[75] Inventor: Herbert Schneider, Haimhausen, Fed. Rep. of Germany

[73] Assignee: SÜD-Chemie AG, Fed. Rep. of Germany

[21] Appl. No.: 861,910

[22] Filed: Dec. 19, 1977

[51] Int. Cl.² .................... B60G 17/00; B60B 11/00
[52] U.S. Cl. ........................ 280/81 R; 180/24.02; 280/86; 280/708; 280/112 R; 280/767
[58] Field of Search ............ 280/81 R, 81 A, 80 R, 280/112 R, 86, 689, 690, 767, 702, 708, 711, 432; 180/24.02

[56] References Cited

U.S. PATENT DOCUMENTS

| 3,035,851 | 5/1962 | Stengelin | 280/112 R |
| 3,771,812 | 11/1973 | Pierce et al. | 180/24.02 |
| 3,958,654 | 5/1976 | Le Salver et al. | 280/708 |

FOREIGN PATENT DOCUMENTS 2340011 2/1975 Fed. Rep. of Germany ........ 280/81 R

*Primary Examiner*—Robert R. Song
*Attorney, Agent, or Firm*—Dressler, Goldsmith, Clement, Gordon & Shore, Ltd.

[57] ABSTRACT

A removable frame for reduction of axle loads for heavy vehicles is disclosed herein. The frame includes a pair of lever arms pivoted to each other at one end with adjustable biasing means between the free ends of the lever arms. One of the lever arms has at least one wheel supported thereon while the other arm is rotatably connected to a support member adapted to be attached to a vehicle frame. A centering mechanism normally maintains the lever arm in a predetermined position on the support member and accommodates rotation with respect to each other.

6 Claims, 2 Drawing Figures

SUPPLEMENTARY SUPPORT FOR VEHICLES

BACKGROUND OF THE INVENTION

The invention relates to a mobile frame for the reduction of the axle loads of heavy vehicles, comprising at least one rotor wheel and one supporting member.

In construction machines, such as dredges, concrete mixers or the like, as well as in farm machinery, it is known to provide mobile frames on the vehicle frames which only are placed in contact with the road surface if and when the machines are to be moved over greater distances or if loads are higher than under normal operations. By using the mobile frames the loads upon the remaining axles are reduced and particularly on bridges and in case of insufficiently solidified ground the distribution of the load becomes more uniform. The mobile frames fixedly arranged at the vehicle frame, however, demand considerable constructive expenses and must remain permanently at the vehicle, although they are used relatively rarely. That is why the system of placing heavy construction machinery on flat-bed trailers, when it is to be hauled over major distances has been maintained. However, this produces two additional disadvantages, because as a rule a flat-bed trailer must be requisitioned and thus it is not available at all times and modern construction machines frequently are so high that in case of low underpasses, as they can be encountered precisely in the country, problems may arise which require considerable detours.

Consequently, the present invention is based on the problem of eliminating these disadvantages and to create a mobile frame which is inexpensive, adaptable and easy to handle.

SUMMARY OF THE INVENTION

In order to solve this problem, it is proposed with regard to the mobile frame described initially and according to the present invention, that it is provided with two lever arms interconnected by means of an articulation or pivotal connection. A trigger or biasing mechanism is arranged between their free ends, with one of the levers having a supporting member connected to the frame of the vehicle, and the other lever supporting at least one axle with at least one rotor wheel.

The mobile frame so designed is a simple, compact apparatus which can be arranged at any appropriate location beneath the frame. For example, in case of dragline vehicles it may be arranged between the dragline unit and the motor unit in such a fashion that it grips below the crossbeam which on the one hand bears both arms for the positioning of the dragline bucket and on the other hand the supporting arm for connecting the dragline unit to the motor unit. Two mobile frames are appropriately arranged below the crossbeam. Advantageously they are designed as pendulum roller frames by positioning the supporting member at the upper, substantially horizontal lever arm about a vertical shaft in a rotatable manner. That way the mobile frames are self-adjusting to the direction of travel and the vehicle can be steered in the usual manner.

In case of heavy dragline vehicles about 55% repose on the axle of the motor unit and about 45% of the entire load repose on the axle of the dragline unit. Two mobile frames below the crossbeam can handle about 28% of the total load. At the same time the axle load at the motor unit is reduced to about 37%, and the one at the dragline unit to about 35%. Thus, the entire load is distributed in the range between 28% and 37% substantially more uniformly than without the use of one or two mobile frames, so that a correspondingly more uniform load results on bridges or unfavorable ground likewise.

The mobile frames may remain in the depot and thus they are protected against contamination and damage as same occur precisely in the case of dragline vehicles. They only are used whenever one of the dragline vehicles is to be moved to a different point of operation or into the shop. They can be used for different vehicles and the supporting element or member may be designed with corresponding adjustability.

An embodiment of the invention is exemplified in the drawing and explained more in detail in the following specification.

DETAILED DESCRIPTION

Figure 1:
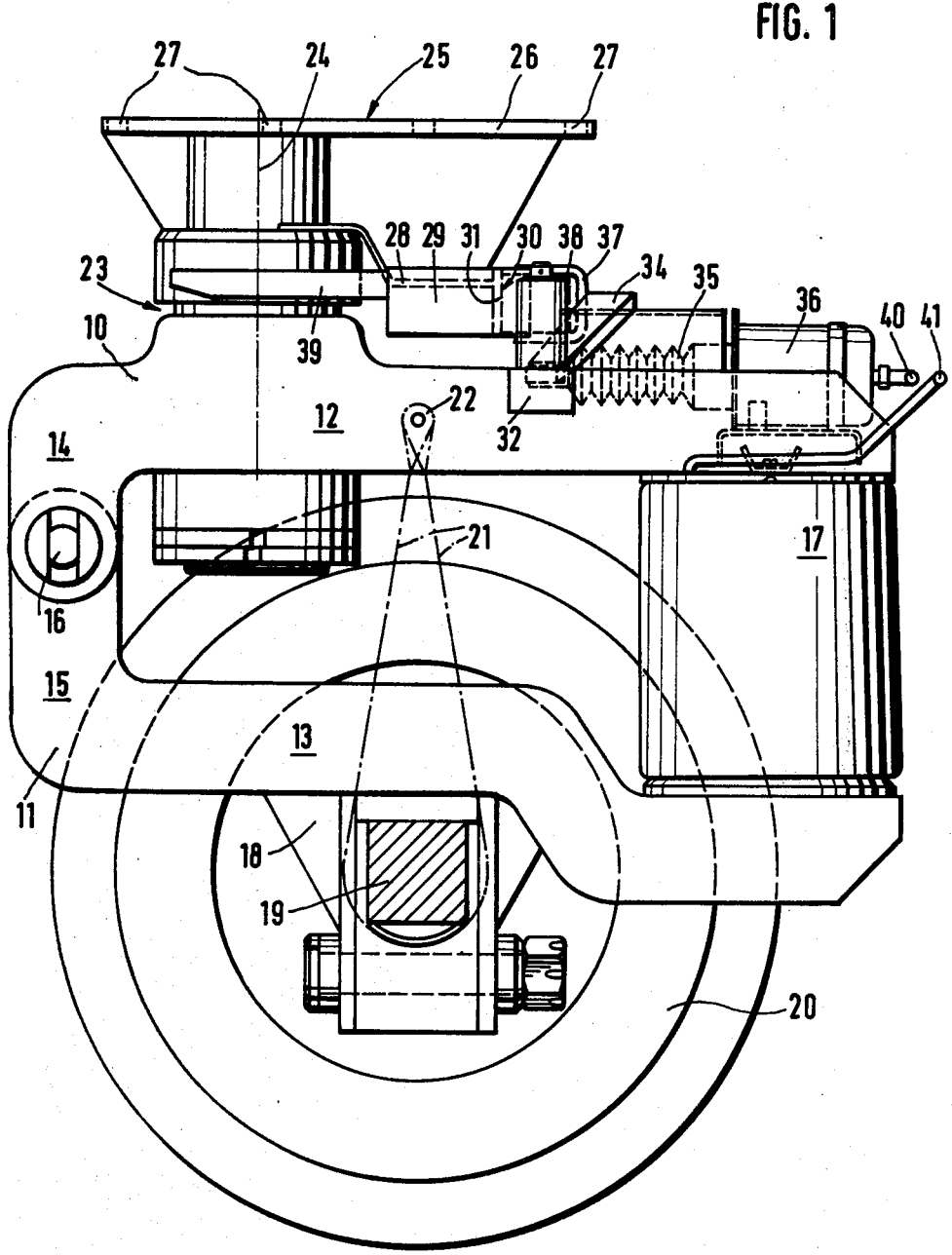
FIG. 1 shows the mobile frame in lateral view with one axle and two rotor wheels, from which one wheel has been removed.
Figure 2:
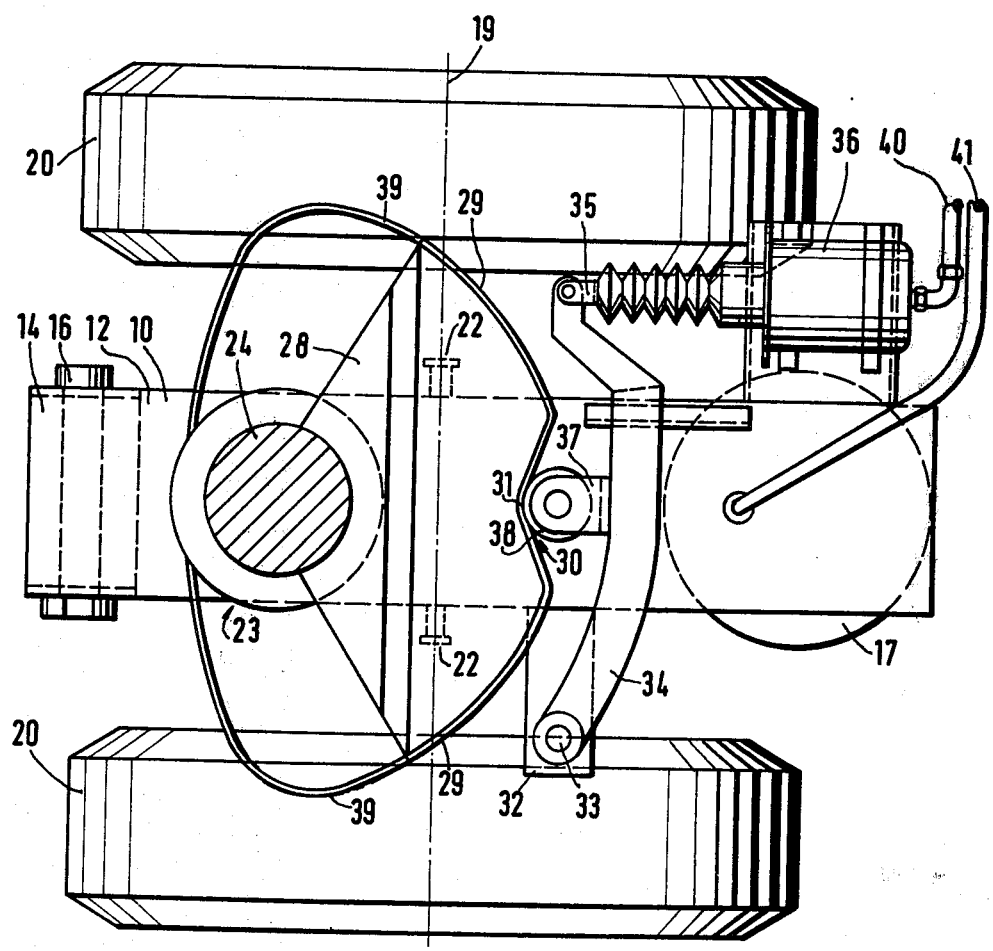
FIG. 2 shows the mobile frame in a top view with the supporting member removed.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention of the embodiment illustrated.

Substantially, the mobile frame comprises two lever arms 10 and 11, both of which are designed as toggle levers. The upper lever arm 10 has a substantially horizontal leg 12 and a substantially vertical leg 14. Correspondingly, the lower lever arm 11 has a horizontal leg 13 and a vertical leg 15. Both vertical legs 14 and 15 are interconnected pivotably by a bearing or pivot pin 16. A trigger or biasing means 17 is arranged between the free ends of the horizontal legs 12 and 13.

A bearing block 18 for supporting a shaft or axle 19 is located on the bottom side of the horizontal leg 13 of the lower lever arm 11. Rotor wheels 20 are positioned in overhung position on both sides of the horizontal leg 13 on said shaft 19.

With the use of a powerful pressure spring (not shown) the trigger or biasing means 17 is so designed that it has a tendency of separating both horizontal legs 12 and 13 about the pivot pin. This is limited by a catch strap or limiting means 21 which at 22 is fastened to the horizontal leg 12 and placed about the shaft 19. The catch strap 21 does not impede the movement of the leg 12 in the direction of the leg 13 as the loads are being applied.

A bearing 23, in which a substantially vertical shaft 24 of a supporting member 25 is guided, is provided on the horizontal leg 12 of the lever arm 10. Appropriately, the bearing 23 is provided with at least one roller bearing, so that the supporting member 25 is easily rotatable about a vertical axis with reference to the leg 12. The supporting member 25 is provided with a connecting plate 26 which may be equipped with perforations 27, so that the connecting plate 26 can be connected to the cross bar, for example, of a dragline vehicle. A mounting plate corresponding to the connecting plate 26 may be provided at the cross bar. At least one spacer means may be arranged between the mounting plate and the connecting plate 26. However, the possibility also exists to arrange the supporting member 25 vertically adjustably at the shaft 24. Likewise, in place of the connecting plate 26 the supporting member 25 may be provided with a fork, into which a cross bar, rib or the like of the frame of a vehicle can be inserted. The supporting member also may be provided with two back-to-back forks which grip below adjacent cross bars, ribs or the like.

In the exemplified embodiment, the supporting member 25 has cooperating means for limiting rotatability of the levers with respect to shaft 24. The limiting means includes a sector-shaped disc 28 extending radially from the shaft 24 for rotation therewith and is provided at its free peripheral edge with an arcuate cam track 29. The cam track 29 has, pointing in longitudinal direction of the mobile frame, a central indentation 30 which forms a continuation of the cam track 29 and has a central root 31. The cam track 29 extends over a circular arc of about 120° and its ends are followed by terminal sections 39.

A bracket 32 with a bearing pin 33 is fastened to the horizontal leg 12 of the upper lever arm 10, laterally above the fastening point 22. A lever 34 is pivoted on the pin 33, with a piston 35 of an operating cylinder 36 attached to the free end of lever 34 and piston 35 is biased to an extended position. Approximately in the center of the lever 34 a bearing 37 supports a cam roller 38 which is biased toward the cam track 29. On a straight path for the vehicle the cam roller 38 is located in the root 31 of the indentation 30. In this position the cam roller 38 is maintained by the operating cylinder 36, whereby the piston rod 35 can escape backward resiliently. This resiliency can be adjusted constantly by a spring or it may be variable by the pneumatic flow medium, which is supplied to the operating cylinder and piston assembly 36 via a conduit 40. A control valve (not shown) which so adjusts the pressure impingement that the cam roller 38 cannot leave the indentation 30, may be provided in the feed conduit 40.

If the force of the fluid medium or the spring is exceeded by turning forces on wheels 20, the wheels can turn and accommodate turning movement of the frame supported thereon.

Another pneumatic flow medium conduit 41 leads to the biasing means or trigger 17 which has a pressure spring (not shown) in the exemplified embodiment and is enveloped by a bellows which is impermeable for the flow medium. A control and/or superpressure valve, likewise not shown, is placed in the flow medium conduit 41. The force of the spring can be reinforced by pneumatic pressure impingement of the trigger 17, so that an increased expanding pressure acts between the horizontal legs 12 and 13 of the lever arms 10 and 11. At the same time the load capacity of the mobile frame increases accordingly. Thus, it can further relieve, for example, in case of dragline vehicle the axle of the dragline unit and that of the motor unit still further. The cross bar of the dragline unir can be engaged in a most simple fashion with the connecting plate 26 of one or two roller frames, by lowering the dragline unit from its topmost position in the direction of its operating position by a certain amount, until the admissible load capacity of the mobile frame has been reached. Unevennesses of the ground or of roads cause shocks to the roller frame, but they are absorbed by the trigger or latch 17 and the superpressure valve in conduit 41.

The mobile frame is usable particularly in case of rubber-tired flatbed dredges for transfers on public roadways and causes a uniform distribution of the loads on the wheel axles, particularly with transverse and if necessary longitudinal stabilization.

What is claimed is:
1. a removable mobile frame for reduction of axle loads of a heavy vehicle comprising first and second horizontal lever arms pivotally interconnected at one end, biasing means interposed between free ends of said lever arms, a supporting member connected to said first lever arm and adapted to be attached to said vehicle, the connection between said supporting member and said first lever arm including a shaft defining a vertical rotatable pivot axis between said first lever arm and said supporting member, means normally maintaining said supporting member and said first lever arm in a predetermined position and accommodating rotation from said predetermined position, said last means including a cam track on said supporting member and a cam on said first lever arm biased into engagement with said cam track with said cam track defining said predetermined position, and at least one axle and one rotor wheel on said axle connected to said second lever arm.

2. A mobile frame as defined in claim 1, further including means for varying the biasing force on said cam.

3. A mobile frame as defined in claim 1, further including means for varying the biasing force of said biasing means between said lever arms.

4. A mobile frame as defined in claim 3, in which said means for varying the biasing force includes a cylinder and piston assembly and means for supplying pneumatic fluid to said assembly.

5. A mobile frame as defined in claim 1, in which said axle has a pair of wheels at opposite ends thereof located on opposite sides of said lever arms.

6. A mobile frame as defined in claim 5, further including limiting means defining an extreme biased position for said lever arms.

* * * * *